United States Patent [19]

Jensen

[11] Patent Number: 4,473,901
[45] Date of Patent: Sep. 25, 1984

[54] SELF CLOCKING SAMPLED ANALOG DATA TRANSMISSION SYSTEM

[75] Inventor: Daniel R. Jensen, Middletown, R.I.
[73] Assignee: Raytheon Company, Lexington, Mass.
[21] Appl. No.: 345,838
[22] Filed: Feb. 4, 1982
[51] Int. Cl.³ .............................................. H04J 3/06
[52] U.S. Cl. ................................ 370/100; 370/110.1; 370/114; 370/4; 375/24; 375/113
[58] Field of Search ................... 370/100, 114, 110.1, 370/4; 332/1; 375/24, 113; 455/70

[56] References Cited

U.S. PATENT DOCUMENTS

| | | | |
|---|---|---|---|
| 2,548,796 | 4/1951 | Houghton | 370/114 |
| 2,689,949 | 9/1954 | Kalbach et al. | 370/4 |
| 2,844,651 | 7/1958 | Pinet | 370/114 |
| 3,017,626 | 1/1962 | Muller | 332/1 |
| 3,126,451 | 3/1964 | Scheftelowitz et al. | 370/110.1 |
| 3,652,800 | 3/1972 | Dooley | 370/114 |
| 3,995,119 | 11/1976 | Pachynski, Jr. | 370/100 |

*Primary Examiner*—Douglas W. Olms
*Assistant Examiner*—Timothy K. Greer
*Attorney, Agent, or Firm*—Martin M. Santa; Joseph D. Pannone; Richard M. Sharkansky

[57] ABSTRACT

The transmission system of this invention provides for transmitting over a fiber-optic line serially sampled analog data from a plurality of channels. Each sampled analog signal has a interleaved digital pulse. A sequence of digital pulses provides synchronization data for the determination in the receiver of the output channel for each received sampled analog signal. The digital pulse associated with each sampled analog signal provides the timing for a sampling circuit to provide as an analog signal each of the sampled analog data as an analog signal to a separate channel. The digital pulses not needed for synchronization are used for digital data transmission.

7 Claims, 2 Drawing Figures

SELF CLOCKING SAMPLED ANALOG DATA TRANSMISSION SYSTEM

BACKGROUND OF THE INVENTION

This invention relates to a data transfer system and more particularly to a system for sending signals from a plurality of sources over a common channel by serially sampling said source signals. This invention is particularly suited for sending signals from sonar trainer hardware to a remote sonar receiver for the purpose of simulating a plurality of transducer signals. In a serially sampled analog system, as in this invention, the pieces of information that must be transferred are the analog samples themselves, clocking information for the receiver sample and hold circuits, and synchronization information to identify the correct channel.

The traditional method of transmitting sampled analog data is to send the sampled analog data and the clocking/sampling information separately. When the timing skew of the driving circuits, the transmission medium, and the receiver circuits are considered, the timing skew soon becomes the dominant design factor and limits the data rate to about 1 Megahertz. For sampling rates higher than this, the clocking information and analog sampled data must, as in this invention, be encoded to follow the same transmission path thereby eliminating the skew problem.

SUMMARY OF THE INVENTION

The aforementioned problems are overcome and other advantages are provided by a transmission system which, in accordance with the invention, provides for the transmission over a single fiber-optic line of the sampled analog data and the sampling signal in a combined form to avoid skewing problems. The transmission system of the invention not only samples analog data from a plurality of channels and encodes it with clocking information, but also provides interleaved digital serial data running at the clock sample rate. A digital pulse associated with each sampled analog signal provides the timing for a sampling circuit contained in each separate channel. Each sampling circuit provides an analog signal obtained from its respective sampled analog signal. The digital data contains a predetermined code of digital data for the purpose of obtaining a synchronization signal for channel selection; the remaining digital data is utilized for the transmission of other information. More particularly, the coding method of the invention utilizes two digital levels, a one and a zero, with appropriate thresholds for each and a range of levels between these thresholds for the sampled analog data.

The data to be transferred by the system of the invention includes data from 108 channels of audio data, each channel being sampled at a 45 Kilohertz rate, and sent over a fiberoptic cable for a distance of 1000 feet. The total transmission rate for the system is the number of channels multiplied by the sample rate. The addition of transmission channels for a bias reference and gain reference (for bias and gain recovery in the receiver) to the 108 data channels results in a transmission rate of 5 million samples per second, or a single sample period of 200 nanoseconds. Assuming a 12 MHz overall bandwidth, a single pole bandwidth rolloff, and a required accuracy of 12 bits, a minimum period of the sampled rate due to settling time is 110 nanoseconds. This leaves 90 nanoseconds for the clocking and synchronization information and for timing uncertainty in the recovery circuits.

BRIEF DESCRIPTION OF THE DRAWINGS

The aforementioned aspects and other features of the invention are explained in the following description taken in conjunction with the accompanying drawings, wherein.

DESCRIPTION OF THE PREFERRED EMBODIMENT

Figure 1:
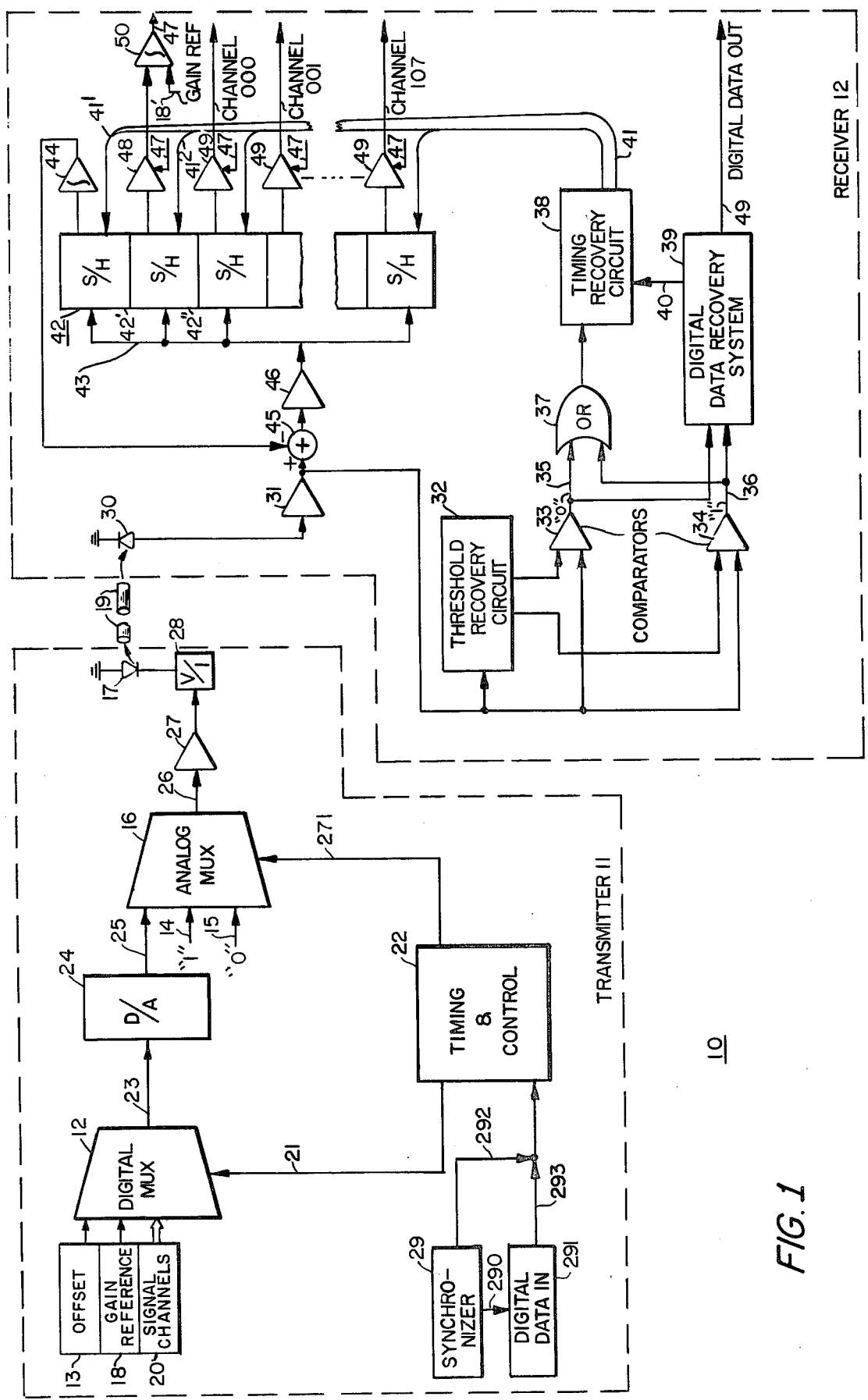
FIG. 1 is a block diagram of a system for the transmission of a large number of channels of sampled analog data over a single fiber-optic line.
Figure 2:
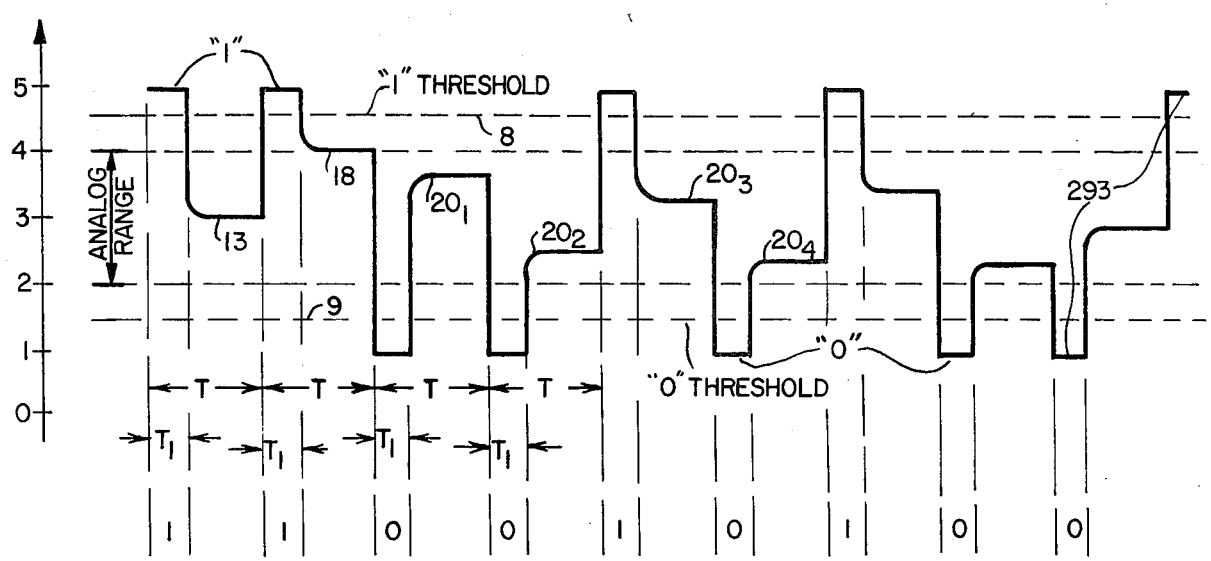
FIG. 2 is a graph showing a typical portion of a transmitted signal.

Referring to FIG. 1, there is shown a block diagram of the transmitter portion 11 and the receiver portion 12 of the transmission system 10 of this invention. The transmitter portion 11 comprises a digital multiplexer 12 having a plurality of input signals in digital format. A digital offset reference signal 13 is applied as one of the inputs. The offset signal 13 has a constant value having a voltage value (3) in arbitrary units as shown in FIG. 2) when converted to an analog signal which is midway between the voltage value (5) assigned to the digital "one" signal 14 and the value (1) of the digital "zero" signal 15, which digital signals are applied to the analog multiplexer 16. The offset reference signal 13 is required in order to bias the light emitting diode transmitter 17 into its linear region.

The digital gain reference signal 18 is also applied as an input signal to the multiplexer 12. When recovered at the receiver 12, the reference signal is used to compensate for the unknown and variable losses caused by the fiber-optic transmission line 19 and its associated connectors and to compensate for circuit gain variations.

The transmission system of the invention is especially adapted to being utilized to transmit information over a single fiber-optic conductor 19; the information, for example, being obtained from 108 audio frequency information channels 20. Each channel 20 is provided as a 12 bit digital signal to the multiplexer 12. The address signal to the multiplexer 12 is provided on line 21 by the timing and control unit 22 to cause the signals 13, 18 and the 108 channels 20 to be sequentially sampled and appear at the multiplexer output 23. Since the audio data contained in each of the 108 channels 20 is to be sampled at a 45 Kilohertz rate, the address signal 21 applied to the multiplexer 12 is shifted at a 5 MHz rate. The sampled digital output 23 of multiplexer 12 is applied as an input to a 12 bit digital-to-analog converter 24 whose output is a sequence of sampled analog signals 25 each of whose amplitudes lie between the arbitrary limits 2–4 of FIG. 2. The analog signal 25 is applied as an input to the analog multiplexer 16 in addition to the "one" and "zero" inputs 14, 15, respectively.

A typical analog output signal from multiplexer 16, as it appears on its output line 26, is shown in FIG. 2. The period of time T, 200 nanoseconds, is the reciprocal of the 5 MHz sampling rate required. At the beginning of each period T, the analog multiplexer provides at its output 26 either a one or a zero depending upon the signal on line 271 provided by the timing and control unit 22. If it is assumed that the system has a 12 MHz overall bandwidth, a single pole bandwidth roll-off, and a required accuracy of 12 bits, the minimum period of the sample rate due to settling time is 110 nanoseconds. This leaves 90 nanoseconds for the time $T_1$, which forms the initial portion of the period T, for the ones and zeros providing the clocking/synchronization information and for timing uncertainty. The 5 MHz sampling signal on line 27¹ from timing and control unit 22 thus provides the address to multiplexer 16 which is required to select either a "one" or a "zero" at the output of the multiplexer 16 during the initial 90 nanoseconds of each sample period T of 200 nanoseconds and provides the address to select the analog information on line 25 during the remaining 110 nanoseconds of each sample period.

During the time $T_1$, the sampled output signals on line 26 of multiplexer 16 are seen in FIG. 2 to have either a one or a zero level. The analog value (3) of the offset reference voltage 13 is sampled and appears in FIG. 2 during the first time interval T as shown. During the second time interval, the sampled value (4) of the gain reference voltage 18 is provided on line 26. In the following time interval, the sampled analog voltage of channel 1 of the 108 channels 20 is shown as signal $20_1$. In the subsequent time intervals, the sampled values of the analog signals on channels 2 through 108 are shown as signals $20_2$, $20_3$, $20_4$. The train of signals on line 26 are provided to voltage amplifier 27 and driver amplifier 28 which provides a current to the light emitting diode 17 (whose light output is proportional to current) in proportion to the voltage applied to driver 28. The output from light emitting diode 17 is coupled to the fiber-optic cable 19, which may typically be 1000 feet long.

The light transmitted through fiber-optic cable 19 is detected in light responsive PIN diode 30 of receiver 12. Diode 30 produces an electrical signal which is amplified in amplifier 31 to provide a signal amplitude suitable for the threshold recovery circuit 32. The threshold recovery circuit 32 recovers the digital threshold levels 8, 9 shown in FIG. 2 by detecting the positive and negative peak values of the received signal. The difference between the positive and negative peaks is obtained from which the thresholds 8, 9 are established.

The signal transmission method which has been implemented not only samples the analog data from the offset reference 13, the gain reference 18, and the 108 channel signals 20, but also contains interleaved serial digital data running at the sample rate. This digital data provides not only the clocking signals 41 for sample and hold circuits 42 but also the synchronization signal and additional digital data during the time the synchronization signal is not being transmitted. The coding method consists of two digital levels, a "one" level and a "zero" level which have been arbitrarily assigned values of (5) and (1), respectively, on FIG. 2. Appropriate thresholds for the one and zero digital signals are values of (4½) and (1½), respectively. The range of levels which are valid for the analog data occupy values between (2) and (4). The offset reference voltage 13 has a value of (3), a value which results in light emitting diode 17 operating in its linear region. The gain reference signal has a value of (4) which is a value convenient for gain control purposes as will be seen later in this presentation.

The threshold recovery circuit 32 detects the levels of the ones and zeros and takes a fraction of the difference in these levels to provide threshold signals to the comparators 33, 34. Thus, a "zero" threshold signal 9 provided by circuit 32 to the zero level comparator 33 is one-eighth of this difference above the "zero" level detected in circuit 32. Similarly, the "one" threshold signal 8 is one-eighth of the difference below the value of the detected "one" level. These threshold levels allow the comparator circuits 33, 34 to selectively produce "zero" and "one" outputs on lines 35, 36, respectively in response to the output signals of amplifier 31. The signals on lines 35, 36 are provided to OR circuit 37, whose serial digital output of ones and zeros is provided to timing recovery circuit 38. The zero and one digital output signals on lines 35, 36 are also provided to digital data recovery circuit 39 which detects a prescribed sequence of ones and zeros which, when detected, provide a synchronizing pulse on line 40. The synchronizing pulse on line 40 determines the time of occurrence and the order of sampling of sample and hold circuits 42 by the selectively pulsed one hundred ten lines 41 at the output of the timing recovery circuit 38. For example, the sampling pulse on line 41' occurs at a time which corresponds to the time at which the offset reference signal 13 appears on the input line 43 of sample and hold circuit 42'. The output of sample and hold circuit 42' is integrated in integrator 44 and applied as a negative input to summing circuit 45, the other input of which is the train of received signals as shown in FIG. 2. The output of summer 45 is amplified in amplifier 46 prior to being applied to each of the sample and hold circuits 42. The DC output signal from integrator 44 is thus subtracted in summing circuit 45 from all of the signals which are received in order to remove the offset reference signal 13 from signals 18, 20 which reference signal was added to the signals 18, 20 in the digital multiplexer 12.

The sampling pulse on line $41^2$ gates sample and hold circuit 42" at the time of occurrence of sampled signal 18 on line 43. The output of sample and hold circuit 42" is amplified in a gain controlled amplifier 48 whose output is applied as one input of integrator 50. The other input of integrator 50 is a gain reference signal 18' which is preferably of the same magnitude as the analog value of the gain reference signal 18 at the transmitter 11. The output 47 of integrator 50 is applied as a gain control signal to the amplifier 48 whose gain is thereby controlled to produce an output of amplifier 48 which is equal to the gain reference signal 18'. The amplifiers 49 which are the same as amplifier 48 are also gain controlled by signal 47 to reestablish the analog voltage levels of signal channels 000,...107 at the output of receiver 12 to correspond with the analog voltage levels that they had in the transmitter 11.

Referring now to FIG. 2, a representative train of synchronizing pulse signals 11001010 is shown on FIG. 2. This sequence of pulses, or a longer sequence if desired, is produced on line 292 by synchronizer 29 in the transmitter 11. Synchronizer 29 produces a control pulse on line 290 to a source of digital data 291 which allows the digital data pulses 293 from source 291 to be added to the output digital stream 292 after the synchronizing bits have terminated. The digital bit stream from source 291 is synchronized with the synchronizing pulse stream from synchronizer 29 by pulses on line 290. Since, in the example, only 8 bits are used for the synchronizing pulses, one hundred two digital bits from source 291 are available to be transmitted at intervals T in the interval between the synchronizing bits. The stream of synchronizing bits from synchronizer 29 are converted to a timing pulse in timing and control circuit 22 which synchronizes the sequence of addresses provided on line 21 to the multiplexer 12. In addition, the timing and control unit 22 provides the addresses which control whether a "one", a "zero" or sampled analog signal 25 is transmitted by the analog multiplexer 16 on output line 26. In the receiver, the digital data recovery circuit 39 is responsive to the sequence of synchronizing pulses and provides a synchronizing pulse on line 40 to control the timing recovery circuit 38 to provide sampling pulses on line 41 to sample and hold circuits 42. Also the data recovery circuit 39 gates out the digital data 293 on line 49, which data occurs between the groups of synchronizing pulses as has been previously stated.

Having described a preferred embodiment of the invention it will now be apparent to one of skill in the art that other embodiments incorporating its concept may be used. It is felt, therefore, that this invention should not be restricted to the disclosed embodiment but rather should be limited only by the spirit and scope of the appended claims.

What is claimed is:

1. A method for transmitting and receiving signals from a plurality of sources over a single channel comprising:
   multiplexing said sources to provide a serial sequence of sampled analog values of said signals;
   providing a serial sequence of digital one and zero signals, each of which exceeds their respective threshold voltages, interleaved in time with each of said serial sampled signals, a preselected number of said serial sequence of digital signals forming a preselected code of digital ones and zeros;
   combining said digital signals and said serial sampled signals to form a serial sequence of associated interleaved digital and sampled analog signals;
   transmitting said combined signals over a transmission medium;
   receiving said combined signals from said transmission medium;
   separating said digital signals from said sampled analog signals of said combined signals;
   detecting the coded group of digital signals to provide a timing reference signal;
   providing sampling pulses from each of said digital signals;
   sampling and holding each sampled analog signal using the sampling pulse provided by the digital signal associated with the sampled analog signal; and
   using said timing reference signal to selectively provide each sampling pulse so that each sampled and held analog signal is provided to a predetermined output by its associated digital signal sampling pulse.

2. The method of claim 1 comprising in addition:
   adding the signal of one of said plurality of sources to provide a fixed value offset signal to each of the signals from each of the other sources prior to transmission of said serial sampled analog signals to provide linear transmission of said sampled analog signals; and
   removing said offset signal from said received signals prior to sampling and holding each received signal to thereby preserve the original relative amplitudes of said analog signals.

3. The method of claim 2 comprising in addition:
   providing in said transmitter a predetermined magnitude of a gain-reference signal as one of said plurality of said transmitter sampled analog signals;
   sampling and holding in said receiver the received sampled analog gain-reference signal to provide a continuous analog gain-reference signal;
   amplifying said continuous analog gain-reference signal in said receiver by a variable gain amplifier to provide a received continuous gain-reference signal output;
   minimizing the difference of the received continuous gain-reference signal output amplitude and a signal in the receiver having the same amplitude as the transmitter predetermined gain-reference signal amplitude by providing a gain control signal to said variable gain amplifier to minimize said difference; and
   amplifying each analog signal of the remaining channels in variable gain amplifier means having said gain control signal to provide the same amplification as said received gain-reference signal to reestablish, at the receiver channels, the same amplitudes of analog signals as were transmitted.

4. A system for transmitting and receiving a plurality of signals over a single transmission means comprising:
   means for multiplexing said signals to provide a serial sequence of sampled analog values of said signals;
   means for providing a serial sequence of digital one and zero signals, each of which exceeds their respective threshold voltages, each digital signal interleaved in time and associated with its respective one of said serial sampled signals, a preselected number of said serial sequence of digital signals forming a preselected code of digital ones and zeros;
   means for combining said digital signals and said serial sampled analog signals of said respective providing means to form a serial sequence of interleaved digital and sampled analog signals;
   means for transmitting said combined signals over said transmission means;
   means for receiving said combined signals from said transmission means;
   means responsive to said received combined signals for recovering said received digital signals from said received sampled analog signals and digital signals of said received combined signals;
   means responsive to said received digital signals for detecting the coded group of digital signals to provide a timing reference signal;
   means responsive to said received digital signals for providing sampling pulses from each of said digital signals;
   means responsive to said timing reference signal for providing the sampling pulse associated with each pulsed analog signal; and
   means responsive to the sampling pulse associated with each analog signal for sampling and holding its respective sampled analog signal to provide each sampled and held analog voltage to a predetermined output.

5. The system of claim 4 comprising in addition:
   means for adding to each of said transmitted sampled analog signals a fixed prescribed value of offset signal, said offset signal being transmitted as one of said plurality of sampled analog signals;
   said means for transmitting over a transmission means comprises a light emitting diode having a linear region encompassing said value of offset signal to provide linear amplitude transmission of said sampled analog signals;

said transmission means comprising a fiber-optic line;

said means for receiving said signals from said transmission means comprises a light responsive means;

said means for sampling and holding being responsive to the pulsed analog offset signal to provide a continuous analog offset signal;

means integrating said continuous offset signal; and means for subtracting the output of said integrating means from each of said received sampled analog signals of the channels including said offset signal channel to provide the original relative amplitude relationships of said sampled analog signals at the outputs of said sample and hold means.

6. The system of claim 5 comprising in addition:

one of said sampled analog values of said transmitted signals being a predetermined gain-reference signal;

said means for sampling and holding the received sampled signals providing a continuous analog gain-reference signal output;

means for controlling the amplification of each received analog signal;

means comparing the analog gain-reference signal output to the predetermined analog gain-reference signal to provide a signal to said amplification control means to cause the difference of said compared signals to decrease to a predetermined value, whereby the amplitudes of the analog signals at the outputs of said receiving means are equal to the amplitudes of said signals in said transmitting means.

7. A signal transmission and reception system comprising:

a transmitting system comprising:

a plurality of analog signals;

means for sequentially sampling each of said signals:

means for providing a digital signal interleaved with each of said sampled signals to form a serial sequence of digital and associated sampled analog signals;

means for causing a plurality of a prescribed number of said digital signals to have a prescribed code;

means for causing the remaining plurality of digital signals other than said plurality of said prescribed number of digital signals having a prescribed code to provide a serial digital information stream;

an optical radiation generating means;

means for providing said plurality of interleaved digital and associated sampled analog signals to said radiation generating means; and the radiation magnitude of said generating means corresponding to the amplitude of said digital and sampled analog signals being transmitted over the same transmission path, said radiation being transmitted over a radiation propagation medium, the receiver comprising:

means responsive to said propagation medium radiation to provide a signal containing said interleaved digital and associated sampled analog signals;

means for recovering said digital signals form said interleaved signals and providing corresponding sampling signals;

means responsive to said recovered digital signals for detecting said coded sequence to provide a timing reference for said sampled pulses; and a plurality of sampling and holding means each responsive to a different sampled analog signal and to the sampling signal associated with said sampled analog signal to provide continuous output signal values at the output of each sampling and holding means corresponding to the transmitted sampled analog signals.

* * * * *